(12) United States Patent
Mandal et al.

(10) Patent No.: US 12,130,720 B2
(45) Date of Patent: Oct. 29, 2024

(54) PROACTIVE AVOIDANCE OF PERFORMANCE ISSUES IN COMPUTING ENVIRONMENTS USING A PROBABILISTIC MODEL AND CAUSAL GRAPHS

(71) Applicant: Healtech Software India Pvt. Ltd., Bangalore (IN)

(72) Inventors: Atri Mandal, Bangalore (IN); Sudhir Shetty, Bangalore (IN); Arpit Rathi, Ajmer (IN)

(73) Assignee: Healtech Software India Pvt. Ltd., Karnataka (IN)

( * ) Notice: Subject to any disclaimer, the term of this patent is extended or adjusted under 35 U.S.C. 154(b) by 70 days.

(21) Appl. No.: 17/664,050

(22) Filed: May 19, 2022

(65) Prior Publication Data
US 2023/0105304 A1    Apr. 6, 2023

(30) Foreign Application Priority Data
Oct. 1, 2021 (IN) .............................. 202141044662

(51) Int. Cl.
  *G06F 11/00*     (2006.01)
  *G06F 11/07*     (2006.01)
  *G06F 11/34*     (2006.01)
  *G06N 7/01*      (2023.01)
  *G06N 7/02*      (2006.01)

(52) U.S. Cl.
  CPC ........ *G06F 11/3476* (2013.01); *G06F 11/079* (2013.01); *G06F 11/3409* (2013.01); *G06N 7/01* (2023.01); *G06N 7/02* (2013.01); *G06F 11/0793* (2013.01); *G06F 11/3447* (2013.01)

(58) Field of Classification Search
  CPC ............... G06F 11/079; G06F 11/0793; G06F 11/3409; G06F 11/3447; G06F 11/3476; G06N 7/01; G06N 7/02
  See application file for complete search history.

(56) References Cited

U.S. PATENT DOCUMENTS

| | | | |
|---|---|---|---|
| 9,652,316 B2* | 5/2017 | Gamage | G06F 11/0709 |
| 2008/0222068 A1* | 9/2008 | Bahl | G06N 5/043 |
| | | | 706/46 |
| 2016/0162346 A1* | 6/2016 | Kushnir | G06F 11/079 |
| | | | 714/37 |
| 2017/0068581 A1* | 3/2017 | Qi | H04L 41/0654 |

(Continued)

Primary Examiner — Elmira Mehrmanesh
(74) Attorney, Agent, or Firm — IPHORIZONS PLLC; Narendra Reddy Thappeta

(57) ABSTRACT

Proactive avoidance of performance issues in computing environments. In one embodiment, a causal dependency graph representing the usage dependencies among the various components of a computing environment is formed, the components being associated with key performance indicators (KPIs). A probabilistic model is trained with prior incidents that have occurred in the components to correlate outliers of KPIs in associated components to prior incidents. The training includes determining the correlation based on the causal dependency graph. Upon detecting the occurrence of outliers for performance metrics, an imminent performance issue likely to occur in a specific component is identified based on the probabilistic model and the detected outliers. A preventive action is performed to avoid the occurrence of the imminent performance issue in the specific component.

24 Claims, 14 Drawing Sheets

(56) References Cited

U.S. PATENT DOCUMENTS

| | | | |
|---|---|---|---|
| 2017/0075744 A1* | 3/2017 | Deshpande | H04L 41/0631 |
| 2018/0034685 A1* | 2/2018 | Naous | H04L 41/064 |
| 2018/0253736 A1* | 9/2018 | Rajaram | G06Q 30/016 |
| 2019/0089577 A1* | 3/2019 | Misra | G06N 20/00 |
| 2019/0109926 A1* | 4/2019 | Hotchkies | H04L 67/01 |
| 2019/0318288 A1* | 10/2019 | Noskov | G05B 23/0281 |
| 2020/0293917 A1* | 9/2020 | Wang | G06N 5/022 |
| 2021/0165704 A1* | 6/2021 | Savir | G06F 11/079 |
| 2021/0334194 A1* | 10/2021 | Xiao | G06F 11/3051 |
| 2022/0101148 A1* | 3/2022 | Lin | G06N 20/20 |
| 2022/0318082 A1* | 10/2022 | Slinger | G06F 11/2263 |
| 2023/0050889 A1* | 2/2023 | Kumar Jaya Kumar | G06F 16/9027 |
| 2023/0267033 A1* | 8/2023 | Mandal | G06F 11/3409 714/48 |

* cited by examiner

| Time | Txn_T1_AvgRespTime | Txn_T1_Count | Txn_T2_AvgRespTime | Txn_T2_Count | ... | Txn_T9_AvgRespTime | Txn_T9_Count | ... |
|---|---|---|---|---|---|---|---|---|
| 4/1/2022 11:15 | | | 34.3935 | 1.51033 | ... | 11 | 2 | ... |
| 4/1/2022 11:16 | 3.068 | 2 | 24.3418 | 1.739 | ... | 68 | 13 | ... |
| 4/1/2022 11:17 | 1.792 | 1 | 38.405 | 4.926 | ... | 505 | 86 | ... |
| 4/1/2022 11:18 | | | | 3.54267 | ... | 1,977 | 383 | ... |
| 4/1/2022 11:19 | | | | 186.418 | ... | 2,533 | 724 | ... |
| ... | ... | ... | ... | ... | ... | ... | ... | ... |
| 4/1/2022 11:27 | | | 27.6421 | 1.025 | ... | 4,977 | 383 | ... |
| 4/1/2022 11:28 | 33.102 | 1 | 27.0773 | 7.339 | ... | 17,533 | 724 | ... |

*FIG. 6A*

| Component X1 | | | | | | | |
|---|---|---|---|---|---|---|---|
| Time | CPU_UTIL | DISK_IOREAD | DISK_IOWRITE | EC_CPU_UTIL | ... | CURRENT_OPEN_CURSORS | LOCKS_WAITS |
| 4/1/2022 11:15 | 28.8571 | 141.36 | 971.1 | 21.51033 | ... | 59810 | 0 |
| 4/1/2022 11:16 | 13.068 | 212.2 | 24.3418 | 31.739 | ... | 59873 | 2 |
| 4/1/2022 11:17 | 16.792 | 112.5 | 38.405 | 54.926 | ... | 60772 | 0 |
| 4/1/2022 11:18 | 24.55 | 45.55 | 235.35 | 63.54267 | ... | 61374 | 10 |
| 4/1/2022 11:19 | | 564.5 | 153.8 | 86.418 | ... | 61771 | 19 |
| ... | ... | ... | ... | ... | ... | ... | ... |
| 4/1/2022 11:27 | 17.49 | 5025.5 | 92.6421 | 91.025 | ... | 61798 | 16 |
| 4/1/2022 11:28 | 33.102 | 602.54 | 87.0773 | 70.339 | ... | 61811 | 85 |

*FIG. 6B*

| Component X1 | | | | | | | | |
|---|---|---|---|---|---|---|---|---|
| Time | CPU_UTIL | CPU_Upper | CPU_Lower | CPU_Outlier | DISK_IOREAD | IOREAD_Upper | IOREAD_Lower | IOREAD_Outlier |
| 4/1/2022 11:15 | 28.8571 | 32.156 | 8.890 | 0 | 341.36 | 211.1 | 31.1 | 0 |
| 4/1/2022 11:16 | 13.068 | 15.321 | 4.221 | 0 | 512.2 | 324.34 | 44.3418 | 0 |
| 4/1/2022 11:17 | 16.792 | 19.020 | 5.145 | 0 | 712.5 | 498.40 | 58.405 | 0 |
| 4/1/2022 11:18 | 24.551 | 29.681 | 7.021 | 0 | 845.55 | 566.35 | 75.35 | 0 |
| 4/1/2022 11:19 | | | | | 564.5 | 353.8 | 23.8 | 0 |
| . . . | . . . | . . . | . . . | . . . | . . . | . . . | . . . | . . . |
| 4/1/2022 11:27 | 17.490 | 20.97 | 6.584 | 0 | 802.5 | 552.61 | 82.6421 | 1 |
| 4/1/2022 11:28 | 33.102 | 38.41 | 9.324 | 1 | 602.54 | 387.073 | 67.0773 | 0 |

*FIG. 6C*

| For Incident F1001 | | |
|---|---|---|
| Preventive Action | Confidence Score | Ranking |
| Restart DB1 | 0.78 | 1 |
| Decrease the page size in the DB1 | 0.45 | 2 |
| Break up large batch operations into several smaller operations. | 0.40 | 3 |
| Allocate More Memory for P1 | 0.37 | 4 |

*FIG. 6G*

PROACTIVE AVOIDANCE OF PERFORMANCE ISSUES IN COMPUTING ENVIRONMENTS USING A PROBABILISTIC MODEL AND CAUSAL GRAPHS

PRIORITY CLAIM

The instant patent application is related to and claims priority from the co-pending India provisional patent application entitled, "PROACTIVE AVOIDANCE OF PERFORMANCE ISSUES IN COMPUTING ENVIRONMENTS", Serial No.: 202141044662, Filed: 1 Oct. 2021, which is incorporated in its entirety herewith.

BACKGROUND OF THE DISCLOSURE

Technical Field

The present disclosure relates to computing infrastructures and more specifically to proactive avoidance of performance issues in computing environments.

Related Art

Computing environments contain computing infrastructures (computers, networks, virtual machines, etc.) and software applications deployed thereon for processing user requests. The computing infrastructures can be cloud infrastructures, enterprise infrastructures, a hybrid of cloud and enterprise infrastructures, as is well known in the relevant arts.

Performance issues are often encountered during the operation of computing environments as is well known in the relevant arts. Examples of such issues may include degradation in performance, lack/shortage of resources (processor cycles, memory storage, connectivity bandwidth, etc.) for processing user requests, etc.

Aspects of the present disclosure are directed to avoidance of such performance issues proactively (before the actual occurrence of the issues).

BRIEF DESCRIPTION OF THE DRAWINGS

Example embodiments of the present disclosure will be described with reference to the accompanying drawings briefly described below.

FIG. 6A is a real-time transaction table depicting the transaction metrics captured for various transactions during the operation of a software application, in one embodiment.

FIG. 6B is a real-time resource usage table depicting the usage of the resources (performance metrics) in a component in one embodiment.

FIG. 6C is an outlier table depicting sample outliers detected for performance metrics for a component deployed in a computing environment in one embodiment.

FIG. 6G is a preventive action table depicting a set of preventive actions generated for an imminent performance issue likely to occur in a computing environment in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
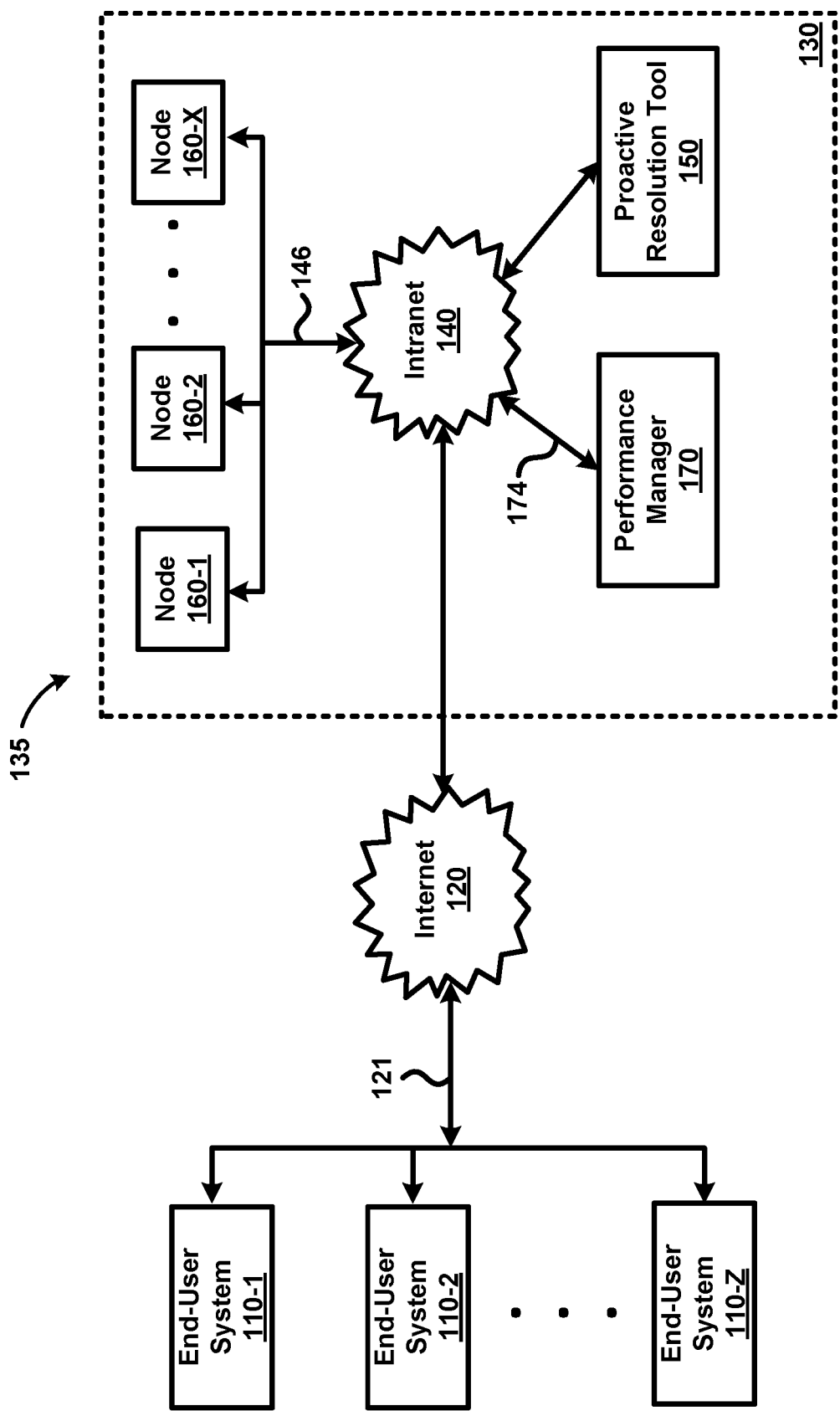
FIG. 1 is a block diagram illustrating an example environment in which several aspects of the present disclosure can be implemented.

Aspects of the present disclosure facilitate proactive avoidance of performance issues in computing environments. In one embodiment, a digital processing system forms a causal dependency graph representing the usage dependencies among the various components deployed in a computing environment during processing of prior user requests, wherein each component is associated with a corresponding set of key performance indicators (KPIs). The system trains a probabilistic model with prior incidents that have occurred in the components, wherein the probabilistic model correlates outliers of one or more KPIs in associated components to prior incidents. The training includes determining the correlation based on the causal dependency graph.

Upon detecting the occurrence of a set of outliers for a first set of KPIs during the processing of user requests, the system identifies an imminent performance issue likely to occur in a first component based on the probabilistic model and the detected set of outliers. The system then performs a preventive action to avoid the occurrence of the imminent performance issue in the first component. In one embodiment the probabilistic model is a Markov network, and the identifying uses a fuzzy matching algorithm to identify the imminent performance issue.

According to another aspect of the present disclosure, as part of detecting the system (noted above) receives from an AIOps (AI for IT operations) system deployed in the computing environment, events indicating the set of outliers.

According to one more aspect of the present disclosure, the system (noted above) also identifies a likelihood of occurrence of the imminent performance issue, an ETA (estimated time of arrival) of occurrence of the imminent performance issue, and a severity score associated with the imminent performance issue.

According to yet another aspect of the present disclosure, the system (noted above) determines a root cause for the imminent performance issue and generates a set of preventive actions based on the determined root cause, the set of preventive actions including the performed preventive action.

According to an aspect of the present disclosure, the first set of KPIs detected are associated with a set of components deployed in the computing environment. The system (noted above) accordingly finds a central component of the set of components in the causal dependency graph and determines the central component as the root cause (of the imminent performance issue).

According to one more aspect of the present disclosure, the system (noted above) produces a ranked list of probable root causes for the imminent performance issue, where the ranking of the probable root causes is based on corresponding confidence scores. The system then selects the root cause (of the imminent performance issue) from the ranked list of probable root causes based on the ranking.

According to another aspect of the present disclosure, as part of performing the preventive action, the system (noted above) provides to an administrator of the computing environment, the details of the imminent performance issue and the preventive action. As such, the administrator is enabled to proactively avoid the occurrence of the imminent performance issue in the computing environment.

According to one more aspect of the present disclosure, the system (noted above) constructing for each node in the causal dependency graph, a corresponding probabilistic distribution function for computing a target KPI, where the probabilistic distribution function is defined as a function of a set of KPIs of the node and KPIs associated with dependent nodes in the causal dependency graph. The system then computing, for each node in the causal dependency graph, using the corresponding probabilistic distribution function constructed for the node, a probability of the target KPI being outside of an acceptable range. The system identifies the imminent performance issue upon determining that the probability is high for at least one node in the causal dependency graph.

According to yet another aspect of the present disclosure, where the causal dependency graph contains a set of end nodes having no further dependencies, the system (noted above) constructs the corresponding probabilistic distribution function for each node by recursively applying the probabilistic distribution function in a bottom-up manner in the causal dependency graph starting from one or more end nodes and moving towards the node in the causal dependency graph.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment in which several aspects of the present disclosure can be implemented. The block diagram is shown containing end-user systems 110-1 through 110-Z (Z representing any natural number), Internet 120, and computing infrastructure 130. Computing infrastructure 130 in turn is shown containing intranet 140, nodes 160-1 through 160-X (X representing any natural number), proactive resolution tool (PRT) 150 and performance manager 170. The end-user systems and nodes are collectively referred to by 110 and 160 respectively.

Merely for illustration, only representative number/type of systems are shown in FIG. 1. Many environments often contain many more systems, both in number and type, depending on the purpose for which the environment is designed. Each block of FIG. 1 is described below in further detail.

Computing infrastructure 130 is a collection of nodes (160) that may include processing nodes, connectivity infrastructure, data storages, administration systems, etc., which are engineered to together host software applications. Computing infrastructure 130 may be a cloud infrastructure (such as Amazon Web Services (AWS) available from Amazon.com, Inc., Google Cloud Platform (GCP) available from Google LLC, etc.) that provides a virtual computing infrastructure for various customers, with the scale of such computing infrastructure being specified often on demand.

Alternatively, computing infrastructure 130 may correspond to an enterprise system (or a part thereof) on the premises of the customers (and accordingly referred to as "On-prem" infrastructure). Computing infrastructure 130 may also be a "hybrid" infrastructure containing some nodes of a cloud infrastructure and other nodes of an on-prem enterprise system.

Intranet 140 provides connectivity between nodes 160, PRT 150 and performance manger 150. Internet 120 extends the connectivity of these (and other systems of computing infrastructure 130) with external systems such as end-user systems 110. Each of intranet 140 and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by Internet 120 and intranet 140. When the packet contains content such as port numbers, which specifies a target application, the packet may be said to be directed to such application as well.

Each of end-user systems 110 represents a system such as a personal computer, workstation, mobile device, computing tablet etc., used by users to generate (user) requests directed to software applications executing in computing infrastructure 130. A user request refers to a specific technical request (for example, Universal Resource Locator (URL) call) sent to a server system from an external system (here, end-user system) over Internet 120, typically in response to a user interaction at end-user systems 110. The user requests may be generated by users using appropriate user interfaces (e.g., web pages provided by an application executing in a node, a native user interface provided by a portion of an application downloaded from a node, etc.).

In general, an end-user system requests a software application for performing desired tasks and receives the corresponding responses (e.g., web pages) containing the results of performance of the requested tasks. The web pages/responses may then be presented to a user by a client application such as the browser. Each user request is sent in the form of an IP packet directed to the desired system or software application, with the IP packet including data identifying the desired tasks in the payload portion.

Some of nodes 160 may be implemented as corresponding data stores. Each data store represents a non-volatile (persistent) storage facilitating storage and retrieval of enterprise by software applications executing in the other systems/nodes of computing infrastructure 130. Each data store may be implemented as a corresponding database server using relational database technologies and accordingly provide storage and retrieval of data using structured queries such as SQL (Structured Query Language). Alternatively, each data store may be implemented as a corresponding file server providing storage and retrieval of data in the form of files organized as one or more directories, as is well known in the relevant arts.

Some of the nodes 160 may be implemented as corresponding server systems. Each server system represents a server, such as a web/application server, constituted of appropriate hardware executing software applications capable of performing tasks requested by end-user systems 110. A server system receives a user request from an end-user system and performs the tasks requested in the user request. A server system may use data stored internally (for example, in a non-volatile storage/hard disk within the server system), external data (e.g., maintained in a data store) and/or data received from external sources (e.g., received from a user) in performing the requested tasks. The server system then sends the result of performance of the tasks to the requesting end-user system (one of 110) as a corresponding response to the user request. The results may be accompanied by specific user interfaces (e.g., web pages) for displaying the results to a requesting user.

In one embodiment, software applications containing one or more components are deployed in nodes 160 of computing infrastructure 130. Examples of such software applications include, but are not limited to, data processing (e.g., batch processing, stream processing, extract-transform-load (ETL)) applications, Internet of things (IoT) services, mobile applications, and web applications. The components may include software/code modules of a software application, external libraries (e.g., DLLs) used by the software application, infrastructure modules (e.g., device drivers) used by the software application, etc. Computing infrastructure 130 along with the software applications deployed there is viewed as a computing environment (135). It should be noted that in the disclosure herein, computing environment 135 includes computing infrastructure 130 and the software applications deployed thereon.

It may be appreciated that each of nodes 160 has a fixed number of resources such as memory (RAM), CPU (central processing unit) cycles, persistent storage, etc. that can be allocated to (and accordingly used by) software applications (or components thereof) executing in the node. Other resources that may also be provided associated with the computing infrastructure (but not specific to a node) include public IP (Internet Protocol) addresses, etc. In addition to such infrastructure resources, application resources such as database connections, application threads, etc. may also be allocated to (and accordingly used by) the software applications (or components thereof). Accordingly, it may be desirable to monitor and manage the resources consumed by computing environment 135.

Performance manager 170 is a computing system that aids in the management of the performance of computing environment 135, in terms of managing the various resources noted above. Broadly, performance manager 170 is designed to process time series of values of various data types characterizing the operation of nodes 160 while processing user requests. The data types can span a variety of data, for example, performance metrics (such as CPU utilization, memory used, storage used, etc.), transaction metrics (e.g., response time for processing each user request, number of user requests processed every duration, etc.), logs, traces, topology, etc. as will be apparent to one skilled in the relevant arts. Based on processing of such values of potentially multiple data types, performance manager 170 predicts expected values of the performance/transaction metrics of interest at future time instances.

In the following disclosure, the term key performance indicator (KPIs) refers to a measure of any aspect of performance of computing environment 135 in processing of user requests received from end-user systems 110. KPIs may be one or a combination of the performance metrics and the transactions metrics noted above, and may be values predicted by performance manager 170 or actual values received from nodes 160.

Performance manager 170 also checks whether the actual/expected values are within (respective) acceptable range (between upper and lower limits). A value outside of such an acceptable range is said to be an outlier. Some of the outliers result in degradation of performance (e.g., shortage of resources), and accordingly performance manager 170 generates or triggers issues/alerts to an end user such as an administrator or SRE (site reliability engineer) of computing environment 135 on the basis of such outliers.

In the following disclosure, the term "event" refers to any outlier determined by performance manager 170, while the term "incident" refers to any identified issue that is provided as a corresponding alert to the end user.

In one embodiment, performance manager 170 uses ML (machine learning) based or DL (deep learning) based approaches for co-relating the performance metrics (with time instances or user requests received from end user system 110) and predicting the events (issues/violations for the performance metrics). Examples of machine learning (ML) approaches are KNN (K Nearest Neighbor), Decision Tree, etc., while deep learning approaches are Multilayer Perceptron (MLP), Convolutional Neural Networks (CNN), Long short-term memory networks (LSTM) etc. Such performance management systems that employ AI (artificial intelligence) techniques such as ML/DL for predicting the outputs are also referred to as AIOps (AI for IT operations) systems.

Performance manager 170 may also be designed to provide reactive risk-management. Upon occurrence of a failure or a defect in the performance of a component of a software application, performance manager 170 may perform RCA (root cause analysis) to determine "What went wrong?". Such reactive RCA is typically performed to reduce the impact and severity of failure or defect that has occurred.

The corrective actions performed after the occurrence are also considered as reactive. It may be appreciated that resolving problems after failure can be more costly than preventing failure from an occurrence. In addition, major failures can cause greater damage to system and interrupt operations.

Accordingly, it may be desirable to perform proactive risk-management before any occurrence of failure or defect. The objective of such pro-active analysis is to determine "What could go wrong?". Such pro-active analysis is performed to mitigate failure or risk and prevent defects from its occurrence. The preventive actions performed before the occurrence are considered as proactive, and facilitate avoidance of (the occurrence of) the performance issues in computing environment 135. It may be appreciated that avoiding problems before occurrence reduces overall cost required to resolve failure by simply preventing failure from occurring. In addition, the overall productivity of the computing environment (135) increases by minimizing chances of interruption due to failure.

Proactive resolution tool (PRT) 150, provided according to several aspects of the present disclosure, facilitates proactive avoidance of performance issues in computing environments (such as 135). Though shown internal to computing infrastructure 130, in alternative embodiments, PRT 150 may be implemented external to computing infrastructure 130, for example, as a system connected to Internet 120. The manner in which PRT 150 facilitates proactive avoidance of performance issues is described below with examples.

3. Proactive Avoidance of Performance Issues

Figure 2:
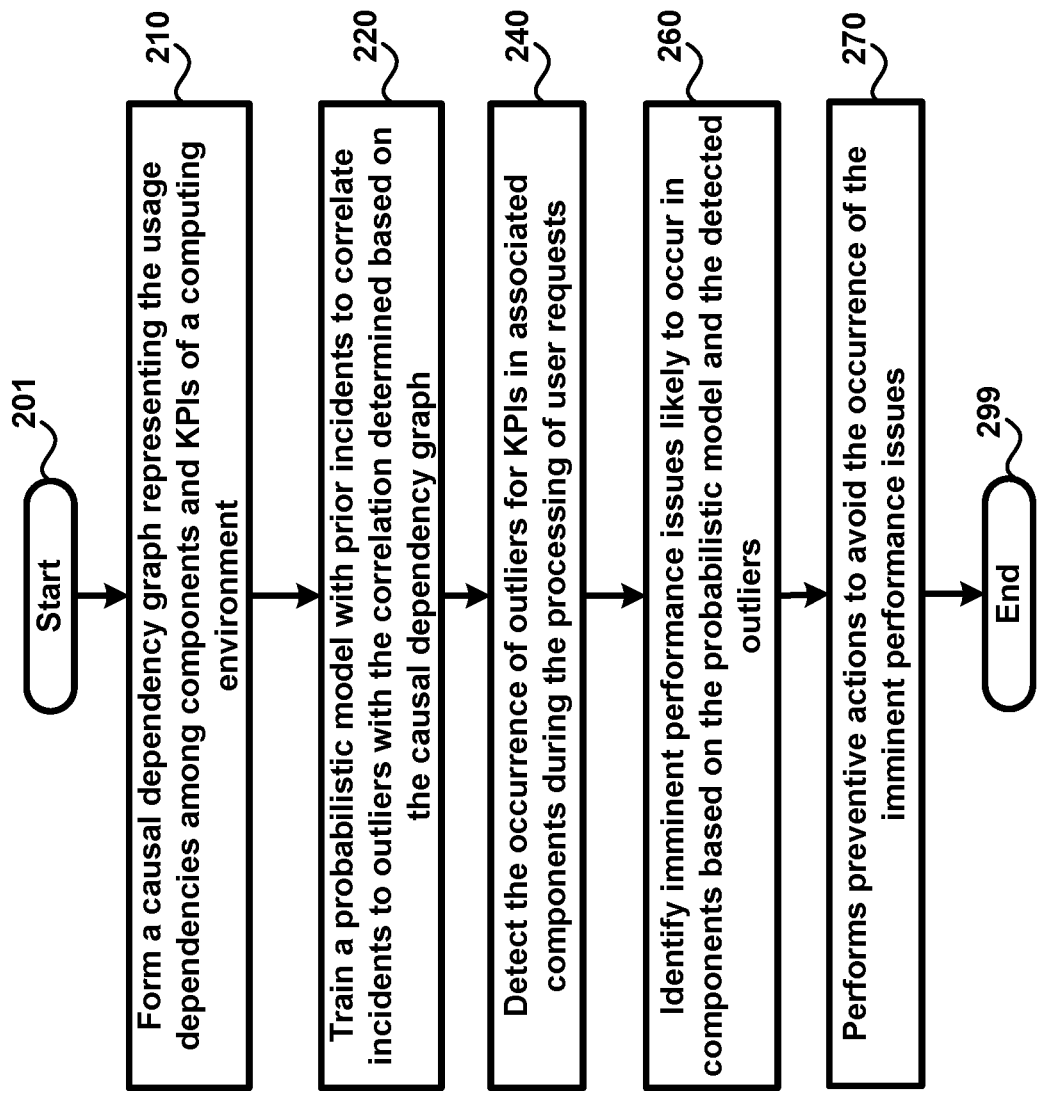
FIG. 2 is a flow chart illustrating the manner in which proactive avoidance of performance issues in computing environments is facilitated according to aspects of the present disclosure.

FIG. 2 is a flow chart illustrating the manner in which proactive avoidance of performance issues in computing environments (such as 135) is facilitated according to aspects of the present disclosure. The flowcharts are described with respect to the systems of FIG. 1, in particular PRT 150, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, PRT 150 forms a causal dependency graph representing the usage dependencies among various components deployed in computing environment 135 during processing of prior user requests. Each component may have an associated set of KPIs. A usage dependency between two components implies that one of the components uses (by invoking) the other component for processing of user requests. While processing user request, the components consume resources measured as corresponding KPIs.

The causal dependency graph is typically in the form of a directed graph, with each node of the graph representing a corresponding component, and an edge of the graph connecting a first node and a second node in the directed graph indicating that a first component represented by the first node uses/consumes/invokes a second component represented by the second node.

In step 220, PRT 150 trains a probabilistic model with prior incidents to correlate incidents to outliers occurring in the components (deployed in nodes 160 of computing environment 135), the correlation determined based on the causal dependency graph. Specifically, the probabilistic model maps the prior occurrences of incidents in the components with the prior occurrences of outliers for KPIs observed in the same or other components deployed in computing environment 135. In one embodiment, the probabilistic model is a Markov network well known in the relevant arts.

The causal dependency graph is used to determine a strength of causality between the incidents and the outliers, with a higher value indicating that the incident has a high probability of occurrence when the corresponding outliers have occurred, and a lower value indicating a low probability. In one embodiment, the strength of causality may be determined based on the distance between the nodes representing the components at which the incident and outliers have occurred.

In step 240, PRT 150 detects the occurrence of outliers for a set of KPIs in associated components during processing of (current) user requests received from end-user systems 110. As is well known, outliers for KPIs typically indicate over or under allocation of resources in corresponding components deployed in computing environment 135. The normal values and/or the extent of deviations forming the basis for outliers may be pre-specified as well, as is well known in the relevant arts.

In one embodiment, PRT 150 receives real-time data such as performance metrics, transaction metrics, logs and transaction traces collected from computing environment 135 during the processing of (current) user requests, and processes the real-time data to determine whether the values therein are outliers (for example, outside of acceptable range of values). In an alternative embodiment, PRT 150 receives events indicating the outliers from an AIOps system (such as performance manager 170) deployed in computing environment 135. The AIOps system may determine the outliers based on the actual values received from nodes 160 (indicating issues/failures that have already occurred) or based on the predicted expected values in future time instances (indicating future issues that are likely to occur).

In step 260, PRT 150 identifies imminent performance issues likely to occur in one or more components based on the probabilistic model and the detected outliers. The term "imminent" indicates that the performance issue is likely to occur in the near future, for example, within 5-15 minutes of the detection of the outliers (or receipt of the events from performance manager 170). The identified performance issues may include, but are not limited to, shortage of resources at the one or more components, failure of the components, etc.

The identification may be performed using a fuzzy matching algorithm that tries to match the detected outliers with the outliers occurring in the probabilistic model. Upon determining a match, the corresponding incidents mapped to the outliers in the probabilistic model may be inspected to determine incidents likely to occur in the imminent future as the imminent performance issues.

In step 270, PRT 150 performs one or more preventive actions to avoid the occurrence of the imminent performance issues in the components. Such preventive actions may include, but are not limited to, allocating more (or some scenarios, less) resources to the vulnerable components, redirecting incoming user requests to other entry components, informing users of possible delays in processing of user requests, etc. According to an aspect, the preventive action is providing to an administrator of computing environment 135, the details of the imminent performance issues and the preventive actions that may be performed to avoid the imminent performance issues, thereby enabling the administrator to perform the desired preventive actions. Control passes to step 299, where the flowchart ends.

Thus, PRT 150 facilitates proactive avoidance of performance issues in computing environments (such as 135). According to an aspect, PRT 150 also performs a proactive root cause analysis (RCA) for each of the imminent performance issues. In particular, for each identified imminent performance issue, PRT 150 produces a ranked list of probable root causes for the imminent performance issue, the rankings of the probable root causes being based on corresponding confidence scores. PRT 150 selects a specific root cause from the ranked list of probable root causes based on the ranking and then generates a set of preventive actions based on the selected specific root cause. One or more preventive actions from the set of preventive actions may then be performed by PRT 150 to avoid the imminent performance issue.

The manner in which PRT 150 provides several aspects of the present disclosure according to the steps of FIG. 2 is described below with examples.

4. Illustrative Example

FIGS. 3A-3B, 4, 5A-5B and 6A-6G together illustrate the manner in which proactive avoidance of performance issues in computing environments (such as 135) is facilitated in one embodiment. Each of the Figures is described in detail below.

Figure 3A:
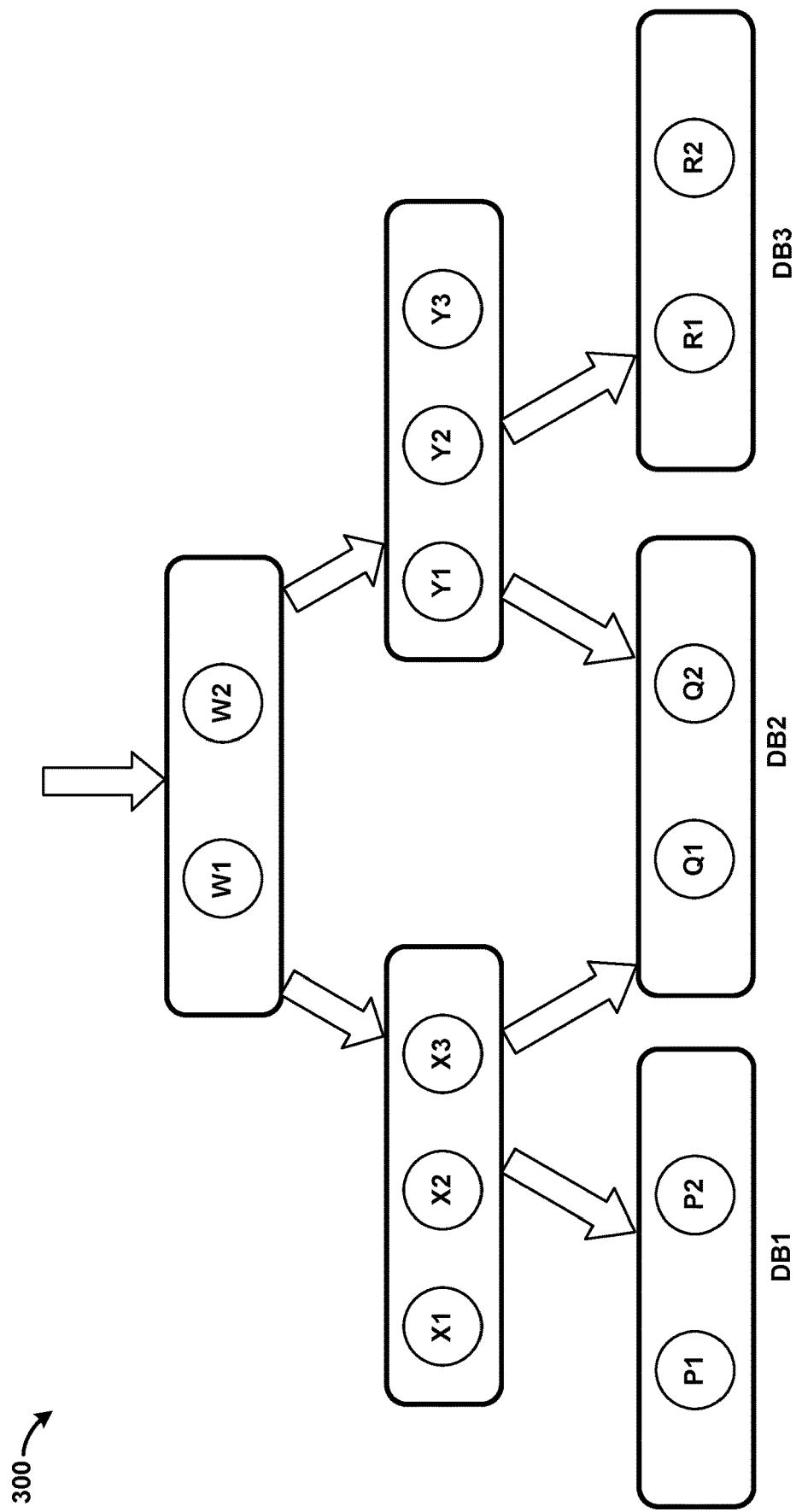
FIG. 3A illustrates the manner in which components are deployed in the nodes of a computing environment in one embodiment.

FIG. 3A illustrates the manner in which components are deployed in the nodes (160) of a computing environment (135) in one embodiment. For illustration, it is assumed that all the components shown in FIG. 3A are of a single software application 300. It may be appreciated that a computing environment may contain less or more components, differing in number and type, depending on the implementation of the computing infrastructure and software applications deployed in computing environment 135.

Each of W1 and W2 represents a software component (also referred to as an "instance") that is designed to process user requests received from external systems (such as end-user systems 110) connected to Internet 120 and send corresponding responses to the requests. For example, W1 may receive (via path 121) user requests from a user using end-user system 110-2, process the received user requests by invoking one or more internal/application services (such as X1, S2, Y1, Y2, etc.), and send the results of processing as corresponding responses to end-user system 110-2. The responses may include appropriate user interfaces for display in the requesting end-user system (110-2). W2 may similarly interact with end-user systems 110 and facilitate the user to perform associated functionality provided by software application 300. Components W1 and W2 are typically deployed in one or more web servers.

Each of components X1, X2, X3 and Y1, Y2, Y3 represents a software component that implements corresponding functionalities of software application 300, and are typically deployed in one or more application servers. Each of DB1, DB2, and DB3 represents a storage component that maintains data used by other components of software application 300. As noted above, each of the data stores may be implemented as a database server or file system based on the implementation of software application 300. Each of components P1, P2, Q1, Q2, R1 and R2 represents a software component that facilitates other components of software application 300 (such as components X1-X3 and Y1-Y3) to access the data maintained in DB1, DB2 and DB3. Components P1-P2, Q1-Q2 and R1-R2 are typically deployed in one or more database servers.

The manner in which components of a software application (300) are executed for processing user requests is described below with examples.

Figure 3B:
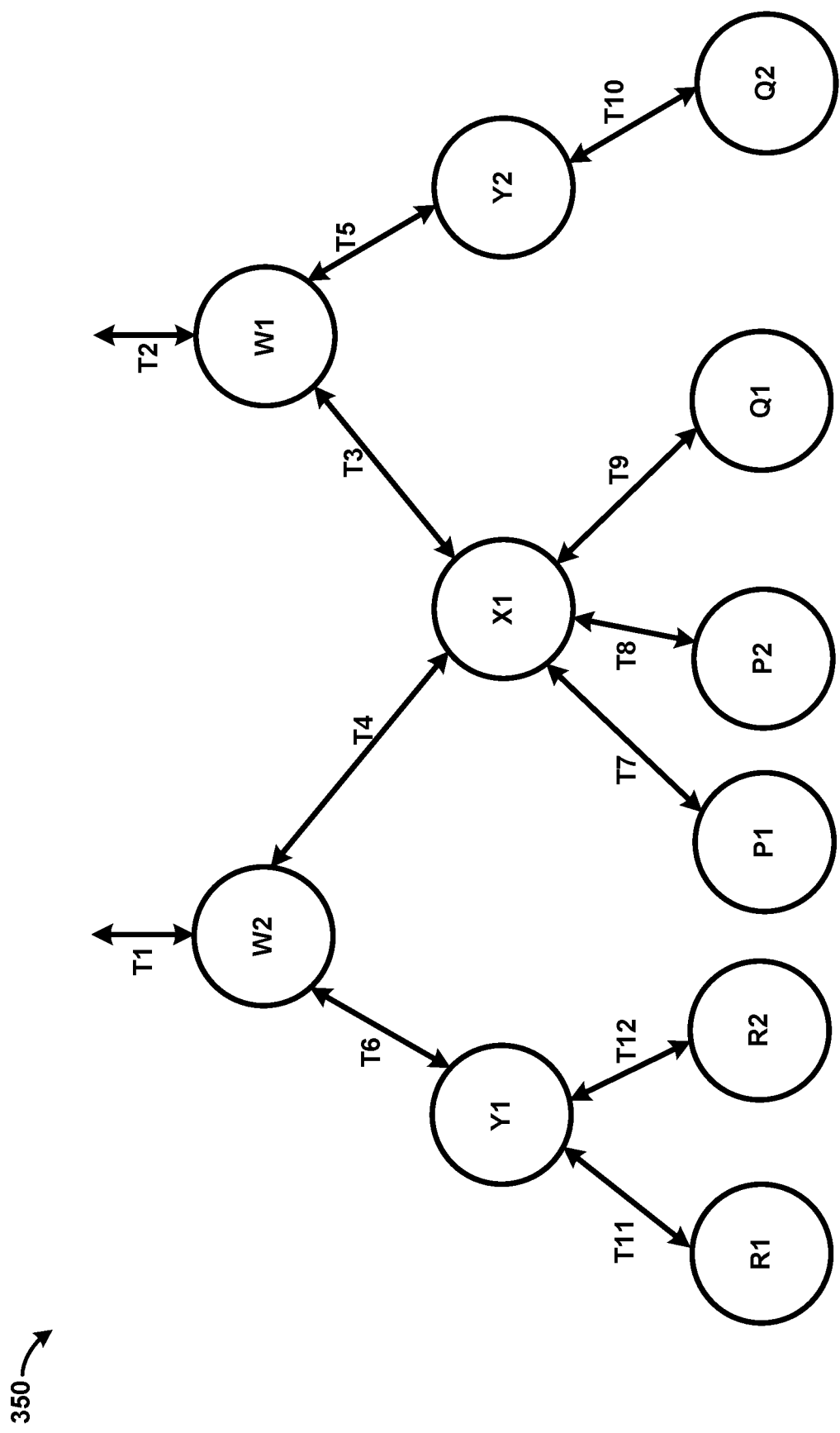
FIG. 3B illustrates the manner in which components deployed in a computing environment are executed for processing user requests in one embodiment.

FIG. 3B illustrates the manner in which components deployed in a computing environment (135) are executed for processing user requests in one embodiment. In particular, topology 350 depicts the manner in which components of software application 300 process user requests received from end-user systems 110. For example, topology 350 indicates that when component W2 receives a user request, component W2 invokes components X1 and Y1, component X1 in turn invokes P1, P2 and Q1 and component Y1 in turn invokes R1 and R2. Similarly, other components are executed when processing other (types of) user requests.

In the following description, each request/invocation of a component and the corresponding response containing the results of invocation of the component is viewed as a "transaction". Accordingly, topology 350 is shown containing transactions T1 through T12 between the components. It should be noted some of the transactions such as T1 and T2 are initiated by user requests, while other transactions such as T6 and T4 are initiated by internal components as part of processing of the user requests.

According to an aspect, a higher-level component such as W1 may be viewed as having a usage dependency on lower-level components such as X1-X3, which in turn may be viewed as having a usage dependency on other lower-level components such as P1-P2. In addition, the execution of the components in computing environment 135 causes the utilization of resources (such as CPU, memory, etc.) in nodes 160. Typically, the resources are utilized by the containers (such as web servers, application servers, database servers, etc.) in which the components are deployed. As such, the set of transactions input to a component is the "cause" for the "effect" i.e., the resource utilization of the container for that component. Similarly, the state (described by the performance metrics) of all the containers processing any incoming transactions/user requests is the "cause" for the "effect" i.e., the response time for that transaction. Such utilization of resources may cause performance issues such as shortage of resources, etc.

In one embodiment, software agents (not shown) are deployed at each of nodes 160 in computing environment 135. Agents collect real-time data such as the values for the performance metrics, the transaction metrics, logs, etc. in corresponding durations from nodes 160 during the processing of user requests and forward the values to performance manager 170 and PRT 150. Agents also collect information regarding each service level graphical topology mapping (such as topology 350), host performance metrics for all instances (containers) and components, transaction volumes (number of transactions/user requests received in specific durations) and response time for transaction request to each instance and, traces for all transaction requests. In addition, agents may also collect and store incident reports/data generated by nodes 160 and forward them to performance manager 170 and PRT 150.

PRT 150, according to several aspects of the present disclosure, uses the real-time data, the incident data and topology 350 as the basis for proactive avoidance of performance issues in software application 300 deployed in computing environment 135. An example implementation of PRT 150 is described in detail below.

5. Proactive Resolution Tool

Figure 4:
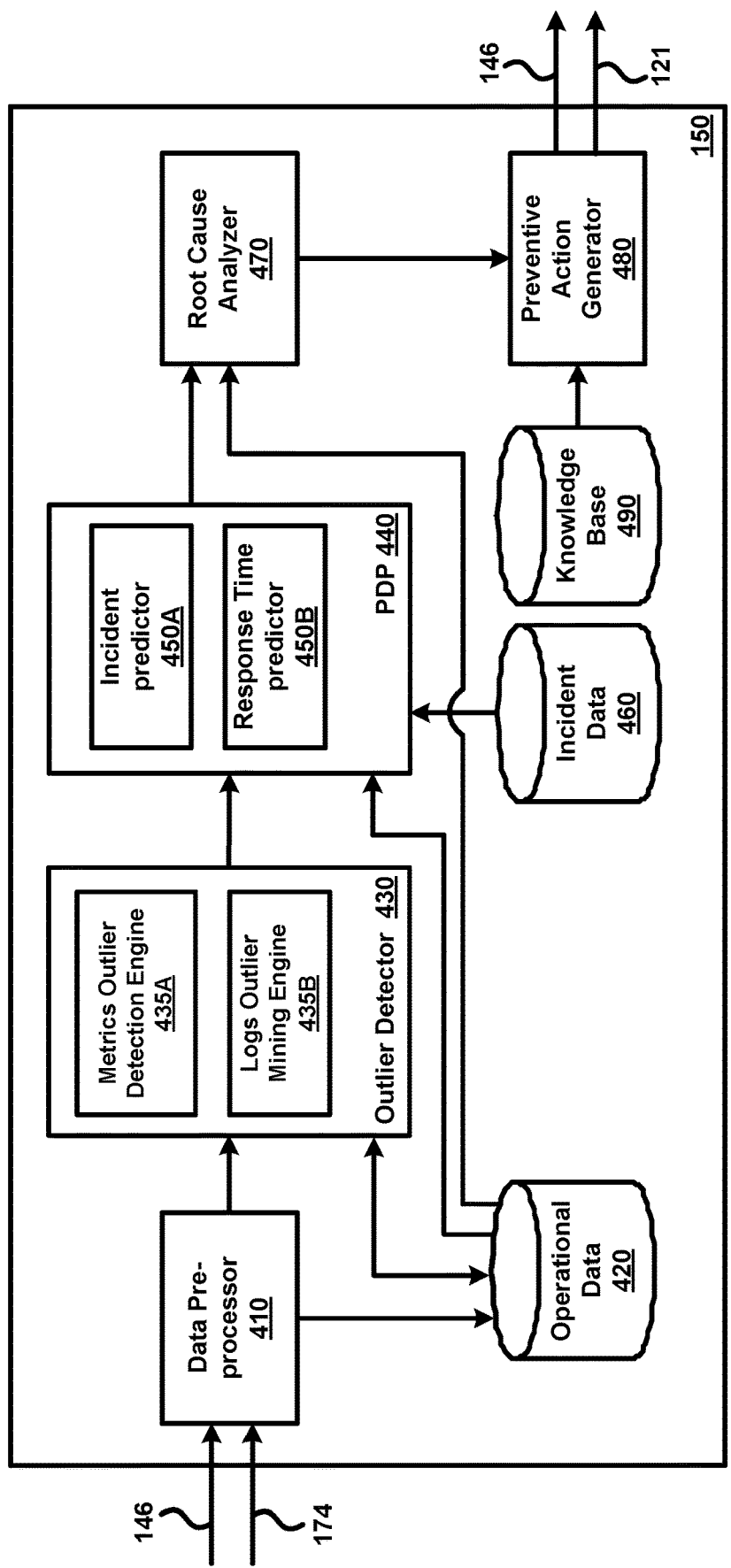
FIG. 4 is a block diagram illustrating an example implementation of proactive resolution tool.

FIG. 4 is a block diagram illustrating an example implementation of proactive resolution tool (150). The block diagram is shown containing data pre-processor 410, operational data 420, outlier detector 430 (in turn shown containing metrics outlier detection engine 435A and logs outlier mining engine 435B), performance degradation predictors (PDP) 440 (in turn shown containing incident predictor 450A and response time predictor 450B), incident data 460, root cause analyzer 470, preventive action generator 480 and knowledge base 490. Each of the blocks of the Figure is described in detail below.

Data pre-processor 410 receives from performance manager 170 (via path 174), events indicating outliers determined in computing environment 135 and stores them in operational data 420. Data pre-processor 410 may also receive from nodes 160 (via path 146), specifically from the agents deployed in nodes 160, real-time data such as performance metrics, transaction metrics and logs collected from computing environment 135 during the processing of user requests. Data pre-processor 410 may then perform pre-processing (data loading, cleaning and preparation) of the real-time data. Pre-processing includes but is not limited to removing incorrect/incomplete data, discretization of data, normalization of data, etc. as is well known in the relevant arts. Data pre-processor 410 stores the pre-processed data in operational data 420 and also forwards the pre-processed data to outlier detector 430. Data pre-processor 410 may also receive and store data specifying topology 350 in operational data 420.

Operational data 420, as well as incident data 460 and knowledge base 490, represents a data store that may be implemented as a database server or as a file server. Operational data 420 maintains portions of operational data such as real-time data, outliers detected, etc. used by other modules of PRT 150. Though shown internal to PRT 150, in alternative embodiments, operational data 420 (as well as incident data 460 and knowledge base 490) may be implemented external to PRT 150, for example, as part of nodes 160 as will be apparent to one skilled in the relevant arts by reading the disclosure herein.

Outlier detector 430 receives the pre-processed data from data pre-processor 410 and process the pre-processed data to detect outliers. Outlier detector 430 may use various engines/software modules for processing specific types of real-time data to detect outliers. For illustration, outlier detector 430 is shown containing/using metrics outlier detection engine 435A that processes the values of performance/transaction metrics to detect outliers, and logs outlier mining engine 435B that processes logs generated by software application 300 to detect outliers.

Metrics outlier detection engine 435A is implemented to take as inputs graphical topology metadata (350), instance-level performance metrics (KPIs), transaction volumes profile and response times and generate as outputs metric events—contextual outliers and the corresponding anomaly scores (indicating the severity of the outliers). Metrics outlier detection engine 435A may be implemented to use univariate and multivariate conditional probability distribution modelling of instance performance metrics given the corresponding incoming transaction volumes profile (number of user requests received in specific durations) in topological context (such as topology 350) and detect outliers by applying a dynamic thresholding mechanism. Outliers may also be detected for transaction volumes and latencies.

Logs outlier mining engine 435B is implemented to take as inputs application and infrastructure metadata, log files from various application components such as W1, W2, X1, X2, etc. and generates as outputs log events—error lines indicating the failure of an instance of a component. Logs outlier mining engine 435B may be implemented to perform extraction of relevant logs details corresponding to a component failure for a small window of time interval around the time of failure, followed by extraction of error lines from the log files using a pretrained classifier enabled to filter out the erroneous lines.

After detecting the outliers, outlier detector 430 stores the details of the detected outliers in operational data 420. It may be appreciated that either by the operation of outlier detector 430 or by the receipt of events from performance manager 170, the details of the outliers that have occurred in a set of components of software application 300 is stored in operational data 420 (in addition to the topology metadata).

PDP (performance degradation predictors) 440 is a set of engines/software modules that proactively predict potential future problems/imminent performance issues, their likelihood, ETA (estimated time of arrival), and severity scores. For illustration, PDP 440 is shown containing incident predictor 450A and response time predictor 450B (as part of the set of engines). However, in alternative embodiments, PDP 440 may contain any number of engines/predictors that take as input the data stored in operational data 420 and predict imminent performance issues. The manner in which predictor engines such as incident predictor 450A and response time predictor 450B may be implemented is described below with examples.

6. Incident Predictor

According to an aspect, incident predictor 450A forms a causal dependency graph captures such causes and effects related to a software application (300) by representing usage dependencies among components of computing environment 135. An example causal dependency graph is described in detail below.

Figure 5A:
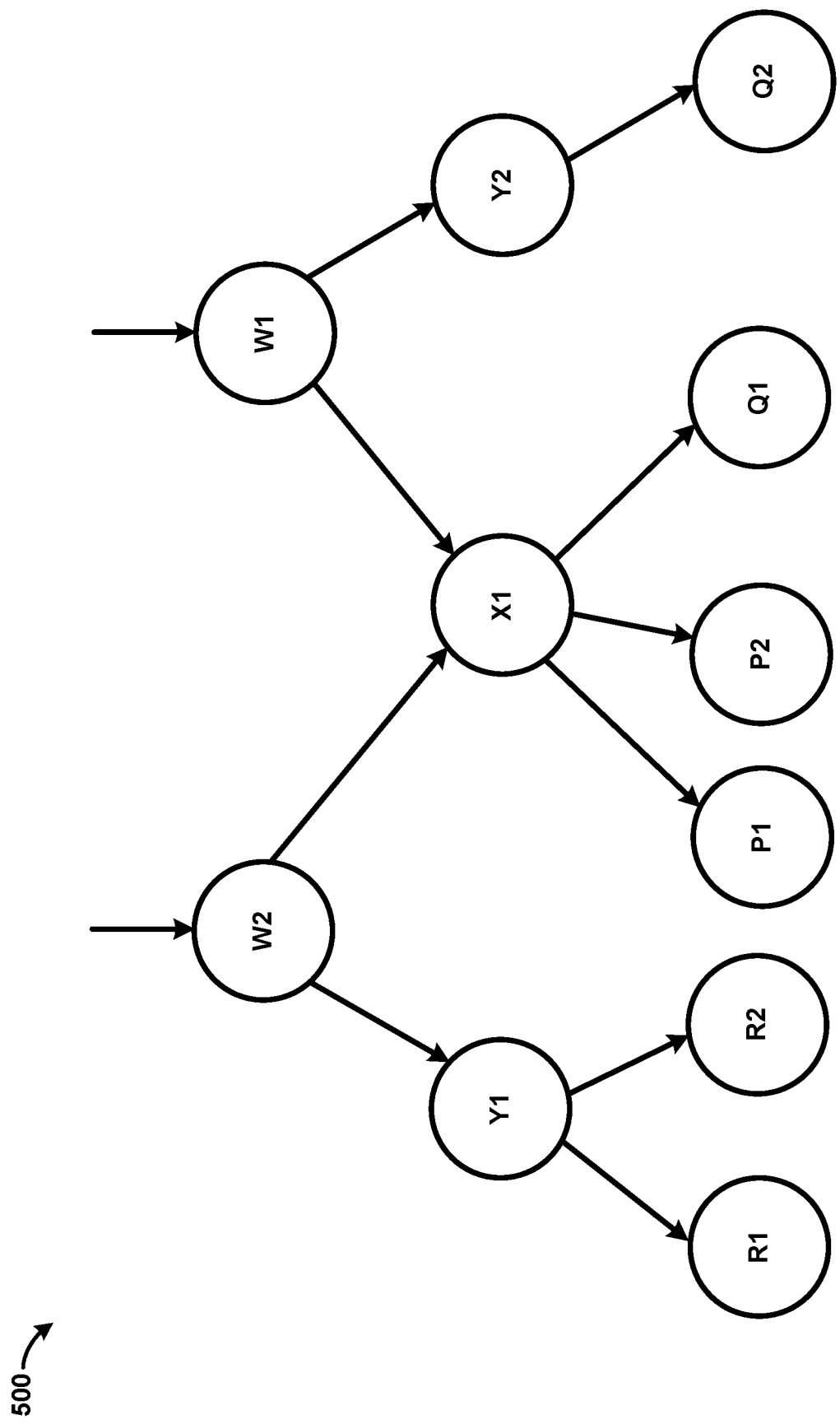
FIG. 5A illustrates a causal dependency graph that captures the usage dependencies among components deployed in a computing environment during the processing of user requests in one embodiment.

FIG. 5A illustrates a causal dependency graph (500) that captures the usage dependencies among components deployed in a computing environment during the processing of user requests in one embodiment. Causal dependency graph 500 is in the form of a directed graph, with each node of the graph representing a corresponding component (such as W1, W2, X1, X2, etc.), and an edge of the graph connecting a first node/component and a second node/component representing an invocation of the second component by the first component.

Though not shown, each node in causal dependency graph 500 also includes a sub-graph that captures the dependencies among the KPIs of the component represented by the node. Thus, causal dependency graph 500 represents the dependencies among the components and the KPIs of software application 300.

It may be observed that causal dependency graph 500 contain one or more entry nodes representing components (W1, W2) which receive the user requests from end-user systems 110, internal nodes representing components (Y1, R1, etc.) that are invoked by an entry component or another internal component during the processing of the user requests and end nodes representing components (P1, P2, Q1) which do no invoke any other component (and accordingly do not have any dependencies in the graph).

Incident predictor 450A takes as inputs the historical incident reports (maintained in incident data 460), the causal dependency graph (500), performance metrics, and log events (stored in operational data 420) and generates as outputs a probabilistic model, predicted future incidents/imminent performance issues, ETA for the performance issues, and severity of the predicted performance issues. In one embodiment, the probabilistic model is a Markov network that correlates incidents to outliers occurring in the components deployed in computing environment 135.

As part of training, the Markov network of incidents (binary dynamic process) along with its edge transition probabilities are learnt using the parameters of a vector autoregressive model with logistic link functions trained on historical incident data maintained in incident data 460. This is followed by pruning of the edges using the strength of topological relationships (for example, determined by transaction volumes, for example, number of transactions per minute) in causal dependency graph 500. During operation, outlier propagation chains are initialized or appended in accordance with the learnt Markov network. Thereafter, the incident reports are parsed to extract the incidents as well as the corresponding preceding outlier propagation chains in terms of error logs and metric events. Accordingly, the Markov network is trained to correlate the occurrences of the outliers to the eventual occurrences of the incidents, with the strength of correlation based on the strength of the relationships as indicated by causal dependency graph 500.

In addition, a fuzzy pattern matching algorithm is trained using supervised learning to take an outlier propagation chain as input and predict future incidents/imminent performance is sues. Thus, in response to determining that outliers for performance metrics of a set of components during the processing of user requests have been detected and stored in operational data 420, incident predictor 450A provides the set of detected outliers as the input outlier propagation chain to the fuzzy pattern matching algorithm, which in turn searches the Markov network for previous outlier propagation chains that match the input outlier propagation chain. If a previous outlier propagation chain has a high level of match (determined based on a threshold, etc.) with the input outlier propagation chain, the corresponding incident that occurred immediately after and/or due to the previous outlier propagation chain may be identified as an imminent performance issue that may occur in the near future time instances.

After identifying the imminent performance issues, incident predictor 450A forwards the details of the identified performance issues to root cause analyzer engine 470, whose operation is described in below sections. The description is continued with the details of the operation of response time predictor 450B.

7. Response Time Predictor

Response time predictor 450B takes as inputs causal dependency graph (500), transaction traces data, response time thresholds, transaction metrics data such as transaction response times and performance metrics (all maintained in operational data 420) and generates as outputs a probabilistic prediction model, predicted future transaction response time degradation (imminent performance issues), ETA, and severity of the predicted performance issue. Broadly, response time predictor 450B constructs a probabilistic distribution function (PDF) for computing a transaction metric for each component. The probabilistic distribution function is defined as a function of a set of performance metrics of the component and transaction metrics associated with any transactions initiated by the component to any later components in the corresponding sequences of components in the causal dependency graph.

According to an aspect, the corresponding probabilistic distribution function for each component is constructed by recursively applying the probabilistic distribution function in a bottom-up manner in the causal dependency graph (500) starting from one or more end nodes/components and moving (up the order) towards the component in the causal dependency graph. It may be appreciated that the applying of the function in a bottom-up manner for a transaction metric at a specific component (such as an entry component) ensures that the response times of the components spawned by the specific component during the processing of prior user requests are also taken into consideration.

Response time predictor 450B then computes probability of the transaction metric being outside of an acceptable range. The probability may be computed for each component in the causal dependency graph using the corresponding probabilistic distribution function constructed for the component. Response time predictor 450B identifies imminent performance issues (likely to occur in a specific component deployed in computing environment 135) upon the computed probability being high for at least one component in the causal dependency graph. It may be appreciated that the condition of computed probability being high is indicative of a performance issue in one of the components. The specific component that is identified may be different from the component in which the condition was satisfied. The manner in which probabilistic distribution function is recursively applied the in a bottom-up manner is described in detail below.

Figure 5B:
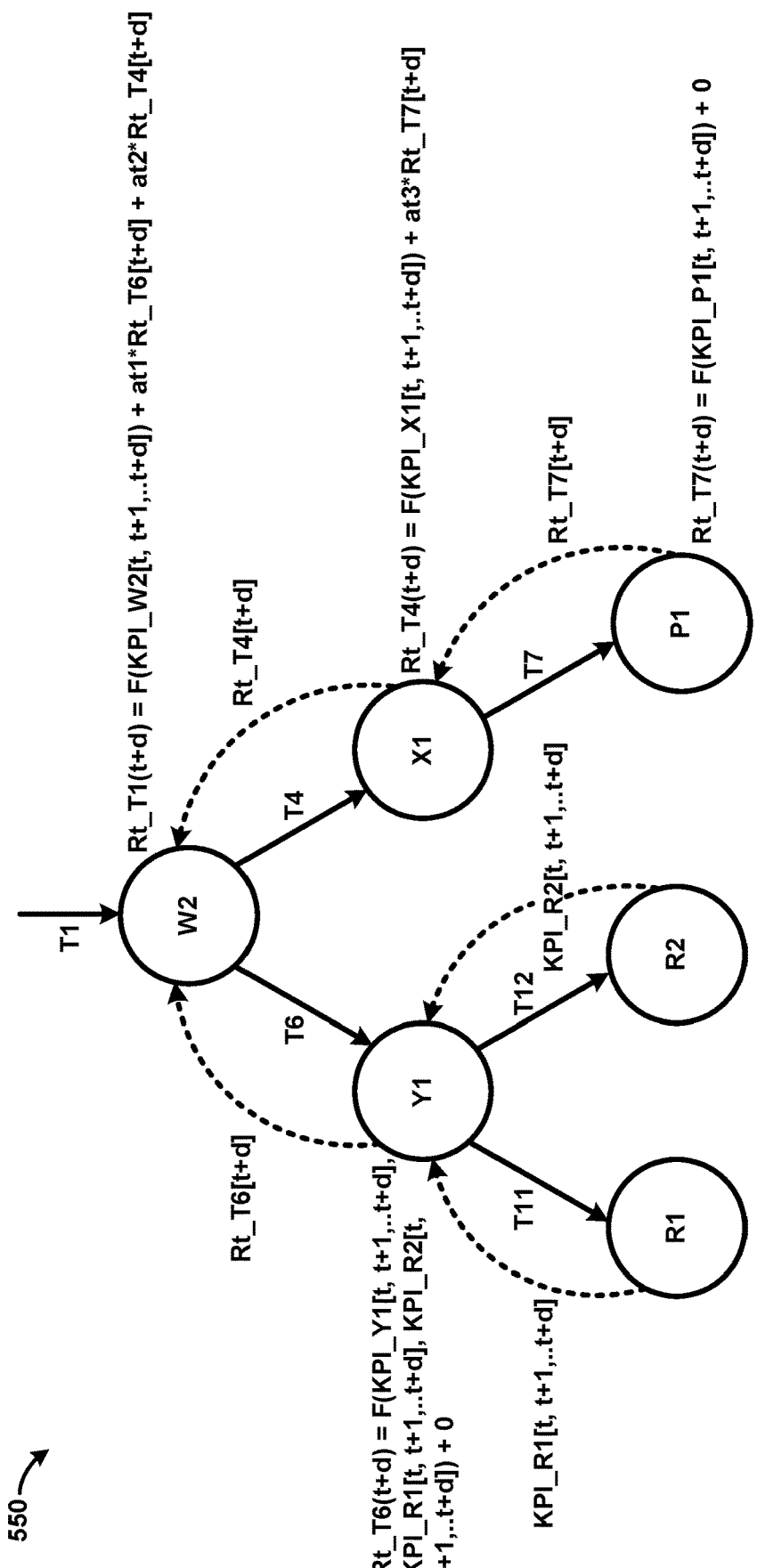
FIG. 5B illustrates the manner in which probabilistic distribution function is applied recursively in a bottom-up manner in a causal dependency graph in one embodiment.

FIG. 5B illustrates the manner in which probabilistic distribution function is applied recursively in a bottom-up manner in an causal dependency graph in one embodiment. In particular, causal dependency graph 550 models the future conditional probability distributions of response times for incoming transaction requests to an instance/component (here, W2) in the topology (350) given its performance metric profile by recursively applying a probabilistic, multi-horizon time-series prediction model in a bottom-up fashion with respect to the topology in order to account for the transactions (T6, T11, etc.) or processes/services (Y1, X1, etc.) spawned in other service instances due to the incoming transaction request (T1) from the user. The probabilistic prediction model uses conditional probabilities based on past occurrences of similar incidents and their propagation paths.

It may be observed that the response time (Rt_T1) for transaction T1 received by component W2 at an imminent future time instance (t+d) is modelled as a function (F being the prediction model) of the performance metrics of W2 (KPI_W2) at the time instances (t, t+1, ... t+d) between the current time (t) and the future time instance, the response times (Rt_T6, Rt_T4) for the transactions invoked/initiated by the component W2. The response times are multiplied by corresponding weights at1 and at2. It may be appreciated that for determining the response time Rt_T6, a similar model may need to be constructed at component Y1 initiated by transaction T6. It may be noted that for components R1 and R2, the performance metrics of R1 and R2 at future time instances are used for modelling the response time of transaction T6, instead of the response time of the transactions (T11, T12) initiated by component Y1

As such to facilitate the construction of the model at an internal/entry node in causal dependency graph 550, the model is applied in a bottom-up manner starting from the end nodes (representing components that have not invoked other components) in causal dependency graph 500, and then moving up the graph to an internal/entry node in the graph. Accordingly, the recursive application of the model may be viewed as a bottom-up traversal of causal dependency graph 550 starting from the end components and moving towards the entry components in the topology.

The estimated response times (Rt_T1) are normalized over all the traces constituting the transaction of interest (T1). If the predicted probability of a certain "transaction response time being greater than an acceptable threshold" is high at some future time instance, an imminent performance issue is identified.

After identifying the imminent performance issues, response time predictor 450B forwards the details of the identified performance issues to root cause analyzer engine 470 which in turn selects a root cause for the imminent performance issue. The selected root cause is used as the basis for generating and performing preventive actions to avoid the occurrence of the identified imminent performance issue. The manner in which preventive actions are performed to avoid the occurrences of imminent performance issues is described in detail below.

8. Performing Preventive Actions

Referring again to FIG. 4, root cause analyzer 470 is implemented to take as inputs the imminent performance issues identified by performance degradation predictors 450, incident reports (maintained in incident data 460), and anomaly/outlier data (maintained as part of operational data 420), and generates as outputs a ranked list of probable root cause(s) for the predicted performance issues, corresponding confidence scores.

According to an aspect, root cause analyzer 470 determines the root cause component/KPI based on the outliers for performance metrics. Upon detecting that the outliers are for a set of components, response time predictor 450B first finds a central component of the set of components based on causal dependency graph 550. The central component may be found using any of the centrality measures well known in graph theory/analytics. It may be appreciated that based on whether outliers are determined based on actual values or predicted values, the central component may represent a root cause component of an already occurred issue or a component in which a future issue is most likely to occur.

According to another aspect, root cause analyzer 470 determines a list of probable root causes using one more root cause analysis technique such as rule based determination, ML/DL based techniques, manually determining the root cause by inspecting the logs/traces, etc. well known in the relevant arts. In one embodiment, a strength of causality is determined based on causal dependency graph 500, or the weights learnt during training using the model artifacts. The outliers corresponding to these features are ranked based on the strength of causality from the learnt weights for probable root-cause candidates and the inverse of its distance from the root node of the corresponding outlier propagation chain for the predicted problem.

After producing a ranked list of probable root causes for an imminent performance issue, root cause analyzer 470 selects a root cause from the ranked list based on the ranking and forwards the selected root causes and the details of the imminent performance issues to preventive action generator 480.

Preventive action generator 480 is implemented to take as inputs the details of imminent performance issues, corresponding root causes, knowledge base articles, diagnostic scripts, etc. (maintained in knowledge base 490) and generates as outputs relevant textual information, recommended diagnostic script(s), and preventive (healing) actions.

An intelligent decision support system (DSS) is implemented for assisting the users (such as SREs) in mitigating the risk posed by the predicted problems by acting on their associated root-cause(s). The DSS comprises of NLP (natural language processing) based information retrieval and text summarization methods for extracting out the most relevant information from the knowledge base articles, a pre-trained model to select the most relevant diagnostic scripts to run from the database, and a rule-based expert system to suggest the user the right set of preventive actions for the problem in context.

Preventive action generator 480 then sends (via path 146) the details of one or more preventive actions to the agents executing in nodes 160. The nodes then perform the preventive actions thereby ensuring that the occurrence of the imminent performance issue is avoided. In one embodiment, preventive action generator 480 may send commands to increase/decrease the allocation of specific resources in nodes 160.

According to an aspect, preventive action generator 480 provides (via path 121) the relevant textual information, recommended diagnostic script(s), and preventive actions as healing actions to an administrator/SRE of computing environment 135. For example, the preventive actions may be displayed on a display unit (not shown) associated with PRT 150 or any of end-user systems 110. The administrator/SRE may accordingly perform the preventive actions to avoid the occurrence of the imminent performance issues.

Examples of preventive actions that are preferred to be performed by an administrator/SRE are restarting a database server instance, breaking up large batch operations into smaller operations, etc. The performance of such preventive actions, either by the nodes or by the administrator/SRE ensures that potential issues such as degradation in performance, lack/shortage of resources (processor cycles, memory storage, connectivity bandwidth, etc.) for processing user requests, etc. are avoided from occurring in computing environment 135.

It may be appreciated that as result of the above aspects, PRT 150 is a novel, smart, self-resilient, preventive healing system for computing environments (135) that not only provides early warnings but also the performs the preventive actions to prevent the anticipated problems/imminent performance issues from happening in the first place.

Thus, PRT 150 facilitates the proactive avoidance of performance issues in software applications (300) deployed in computing environments (135). The description is continued with that may be maintained in PRT 150.

9. Sample Data

FIGS. 6A through 6G depicts sample data used in the proactive avoidance of performance issues in computing environments in one embodiment. Though shown in the form of tables, the sample data may be collected/maintained according to other data formats (such as extensible markup language (XML), etc.) and/or using other data structures (such as lists, trees, etc.), as will be apparent to one skilled in the relevant arts by reading the disclosure herein. Each of the Figures is described in detail below.

In one embodiment, the tables below depict metric data captured for different block durations of 1 minute each. It should be appreciated that the block duration can be of fixed or variable time span, even though the embodiments below are described with respect to a fixed time span (e.g., one minute). Similarly, block durations can be non-overlapping time spans (as in the embodiments described below) or overlapping (e.g., sliding window).

FIG. 6A is a real-time transaction table (600) depicting the transaction metrics captured for various transactions during the operation of a software application (such as 300), in one embodiment. In transaction table 600, the columns indicate the transaction metrics captured, while the rows indicate block durations of one minute each. Each cell thus indicates the value of transaction metric captured for the corresponding block duration. It may be readily observed that for each transaction (e.g., Txn_T1), multiple transaction metrics (such as average response time in column Txn_T1_AvgRespTime and total number/count in column Txn_T1_Count) may be captured.

FIG. 6B is a real-time resource usage table (610) depicting the usage of the resources in a component in one embodiment. Resource usage table 610 depicts the usage of resources such as CPU, memory, etc. in component X1 during the processing of user requests. In resource usage table 610, the columns indicate the various resources used by the component (X1), while the rows indicate the block durations of one minute. Each cell thus indicates the extent/amount of resource used (performance metrics) for the corresponding block duration. Similarly, resource usage tables may be maintained for other components (such as Q1, R1, etc.) of the software application. In addition, or alternatively, a consolidated resource usage table depicting the usage of resource by multiple (or all) components of software application 300 may be maintained.

It may be appreciated that the data of tables 600 and 610 may be received by PRT 150, then pre-processed and outliers may be detected. The manner in which outliers are detected and maintained is described in detail below.

FIG. 6C is an outlier table (620) depicting sample outliers detected for performance metrics for a component deployed in a computing environment in one embodiment. Outlier table 620 depicts the outliers detected for the performance metrics (CPU, DISK_IOREAD, etc.) of component X1. In outlier table 620, the columns indicate for each performance metric, the actual measured value for the performance metric (similar to the column name in table 610), corresponding upper and lower bounds for the same metric (indicated by the suffix "_Upper" and "_Lower") and whether the actual value is within (blank/space) or outside (value "1") the acceptable range as specified in the "_Upper" and "_Lower" columns (indicated by the suffix "_Outlier").

The rows in outlier table 620 indicates the details of the performance metrics in the corresponding block durations. It may be observed that rows 621 and 622 indicate the detection of outliers in the performance metrics CPU and DISK_IOREAD of component X1 in the corresponding block durations. Similarly, the performance metrics of other components of software application 300 deployed in computing environment 135 are processed to detect the outliers.

The data of outlier table 620 may be sent by performance manager 170 to PRT 150 or may be generated by outlier detector 430 by processing the data of tables 600 and 610. It may be appreciated that such detected outliers along with historical incident data (actual occurrences of performance issues in the past time instances) form the basis for proactive prediction of imminent performance issues. The manner in which historical incident data is maintained in described in detail below.

Figure 6D:
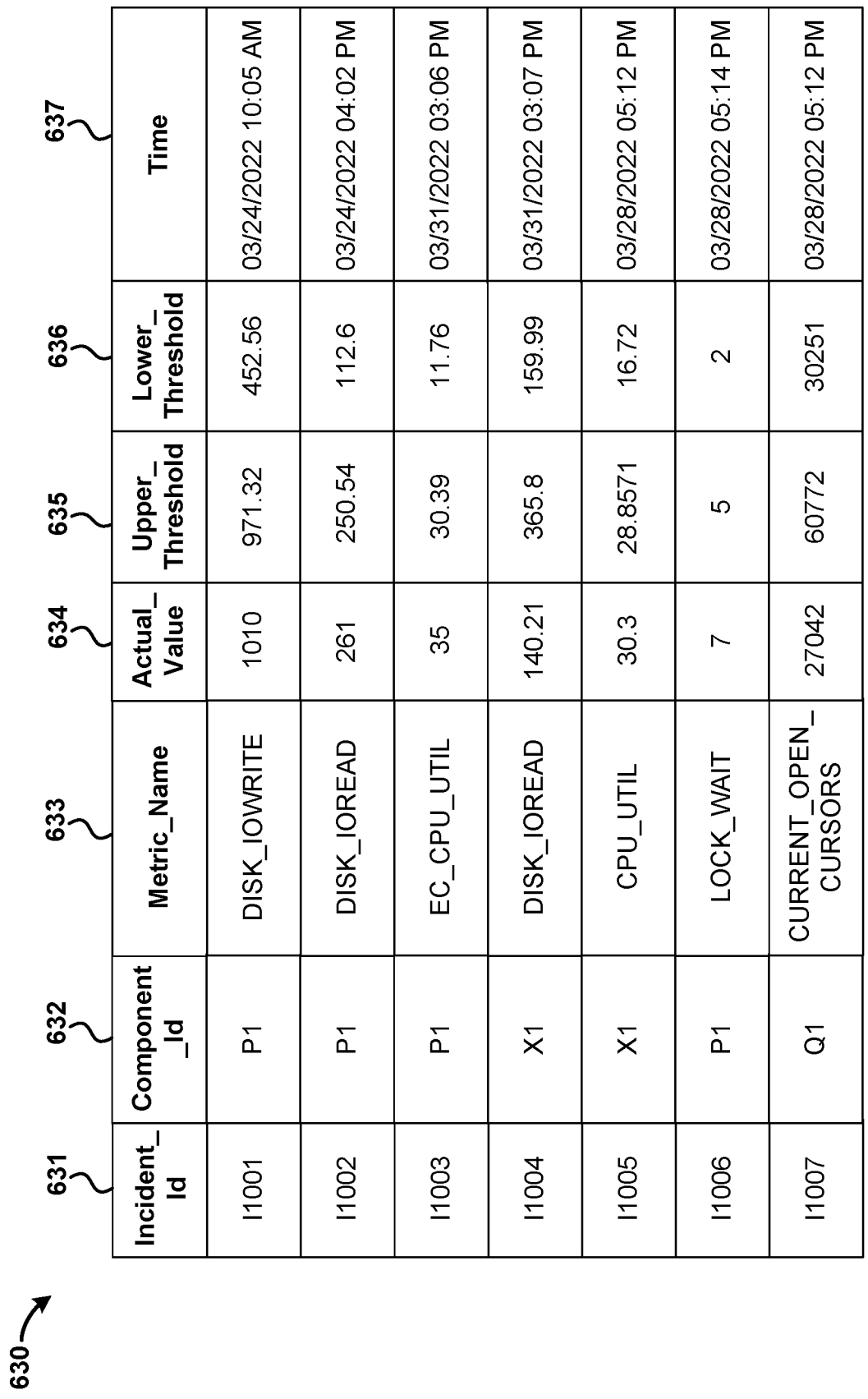
FIG. 6D is an incident table depicting incidents that have previously occurred previously in a computing environment in one embodiment.

FIG. 6D is an incident table (630) depicting incidents that have previously occurred previously in a computing environment in one embodiment. In incident table 630, columns 631 to 633 specify the details of the event such an event identifier, component identifier (as noted in FIG. 3A) of the component whose performance metric was measured, and the name of the performance metric. Column 634 specifies the actual value of the performance metric captured at the component, while columns 635 and 636 specify the upper and lower limits for the performance metric. Column 637 specifies the time interval (block duration) at which the incident occurred. Each of rows of table 630 thus specifies the details of a corresponding incident of the performance metric causing a violation (higher than the upper limit or lower than the lower limit).

As described above, PRT 150, in particular performance degradation predictors 450 take as input the data of tables 620 and 630 and predicts/identifies imminent performance issues/incidents likely to occur in the components of software application (300) deployed in computing environment 135. The manner in which the imminent performance issues may be maintained is described in detail below.

Figure 6E:
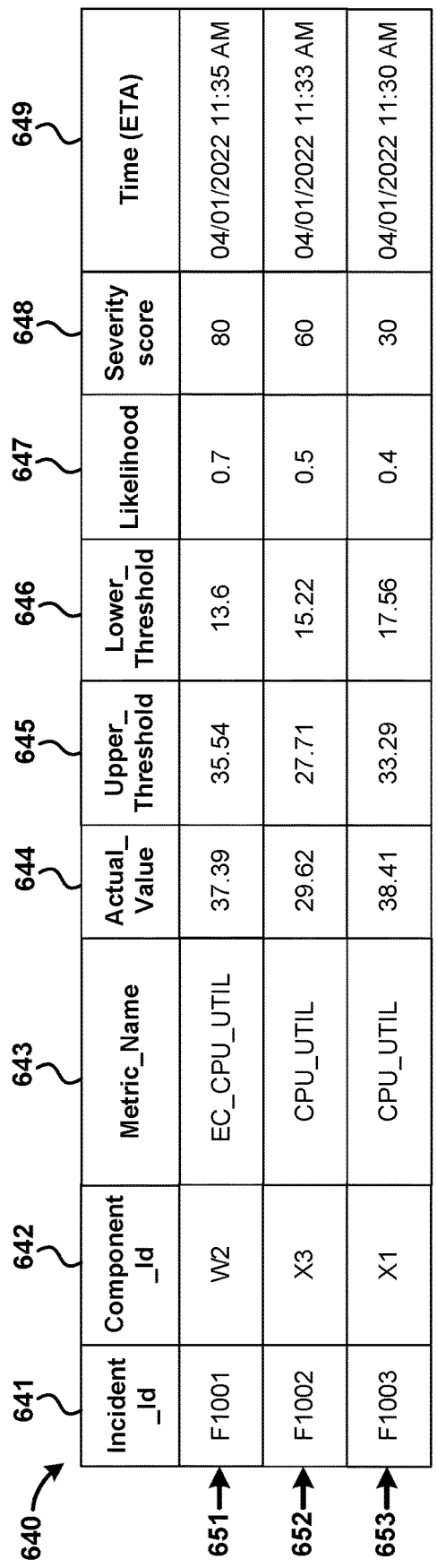
FIG. 6E is an imminent incident table depicting incidents predicted to likely occur in a computing environment in one embodiment.

FIG. 6E is an imminent incident table (640) depicting incidents predicted to likely occur in a computing environment in one embodiment. In imminent incident table 640, columns 641 to 646 are similar to columns 631 to 636 and specify the details of the imminent performance issue such as the component identifier, the metric name, and the possible violation. Column 647 specifies the likelihood (probability) of the occurrence of the corresponding performance issue with a high value indicating that the performance issue is very likely to occur. Column 648 specifies a severity score indicating the severity of the incident, with a high value indicating a possible failure of multiple components of the software application or the application as a whole and a low value indicating that the incident may affect only that component. Column 649 specifies the expected time of arrival/occurrence (ETA) of the performance issue. Each of rows 651-653 specifies the details of corresponding imminent performance issues identified by PRT 150.

The data of table 640 is provided to root cause analyzer 470 which then performs a root cause analysis and produces a corresponding list of probable root causes for each of the imminent performance issues/incidents of table 640. The manner in which a list of probable root causes is generated/maintained in described in detail below.

Figure 6F:
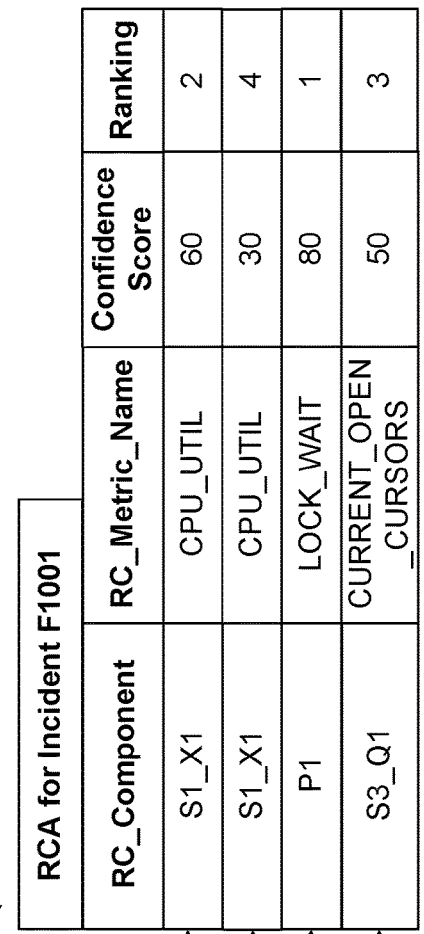
FIG. 6F is a root cause table depicting a list of probable root causes for an imminent performance issue likely to occur in a computing environment in one embodiment.

FIG. 6F is a root cause table (660) depicting a list of probable root causes for an imminent performance issue likely to occur in a computing environment in one embodiment. In particular, root cause table 660 depicts the list of probable root causes for the predicted future incident F1001 (row 651 in table 640). In root case table 660, the columns indicate root cause component, a root cause metric, a confidence score associated with the probable root cause and a ranking. In one embodiment, the ranking is generated based on the confidence score. Each of rows 671-674 specifies the details of corresponding probable root causes determined by PRT 150.

As described above, PRT 150, in root cause analyzer 470 then selects the probable root cause with the highest ranking (here, row 673) as the root cause for the imminent performance issue F1001, and forwards the selected root cause to preventive action generator 480, which in turn generates a set of preventive actions based on the selected root cause. The manner in which a set of preventive actions for an imminent performance issue is generated/maintained is described in detail below.

FIG. 6G is a preventive action table (680) depicting a set of preventive actions generated for an imminent performance issue likely to occur in a computing environment in one embodiment. In particular, preventive action table 660 depicts the set of preventive actions for the predicted future incident F1001 (row 651 in table 640) generated based on the root cause shown in row 673 in table 660. In preventive action table 680, the columns indicate preventive action, a confidence score associated with the preventive action and a ranking generated based on the confidence score.

Each of rows 691-694 specifies the details of corresponding preventive actions generated by PRT 150. It may be observed that some of the preventive actions (such as in rows 692 and 694) may be performed automatically by PRT 150 by sending appropriate commands to nodes 160. It may be preferable to perform some of the preventive actions (such as in rows 691 and 693) manually, and accordingly such preventive actions may be provided/displayed to an administrator/SRE.

Thus, PRT 150 facilitates the proactive avoidance of performance issues in computing environments (such as 135). By combining the output metric and log anomalies, graphical topology, transaction traces, along with historical incidents data, PRT 150 introduces a method for proactive prediction of performance issues, providing insights on their possible root causes in advance and recommending preventive actions to the SREs. PRT 150 can also predict impact radius and similar incidents for proactive action recommendation. Additionally, there is a continuous learning mechanism which takes feedback from past misses of the system and learns to predict them in future, thereby improving the performance of the ML/DL models in the real time.

Furthermore, the proactive performance issue prediction capabilities of PRT 150 provide a significant advantage over some to the typical AIOps systems that are able to detect an incident or a problem only after it has already occurred and impacted the quality of the service. A key advantage of the current disclosure is that while most AIOps systems employ a diagnostic (post-facto) root-cause analysis approach, PRT 150 provides proactive (pre-facto) insights about the possible root-causes of the predicted performance issues and is also able to recommend appropriate preventive actions to prevent the problems from happening in the first place.

It should be further appreciated that the features described above can be implemented in various embodiments as a desired combination of one or more of hardware, software, and firmware. The description is continued with respect to an embodiment in which various features are operative when the software instructions described above are executed.

10. Digital Processing System

Figure 7:
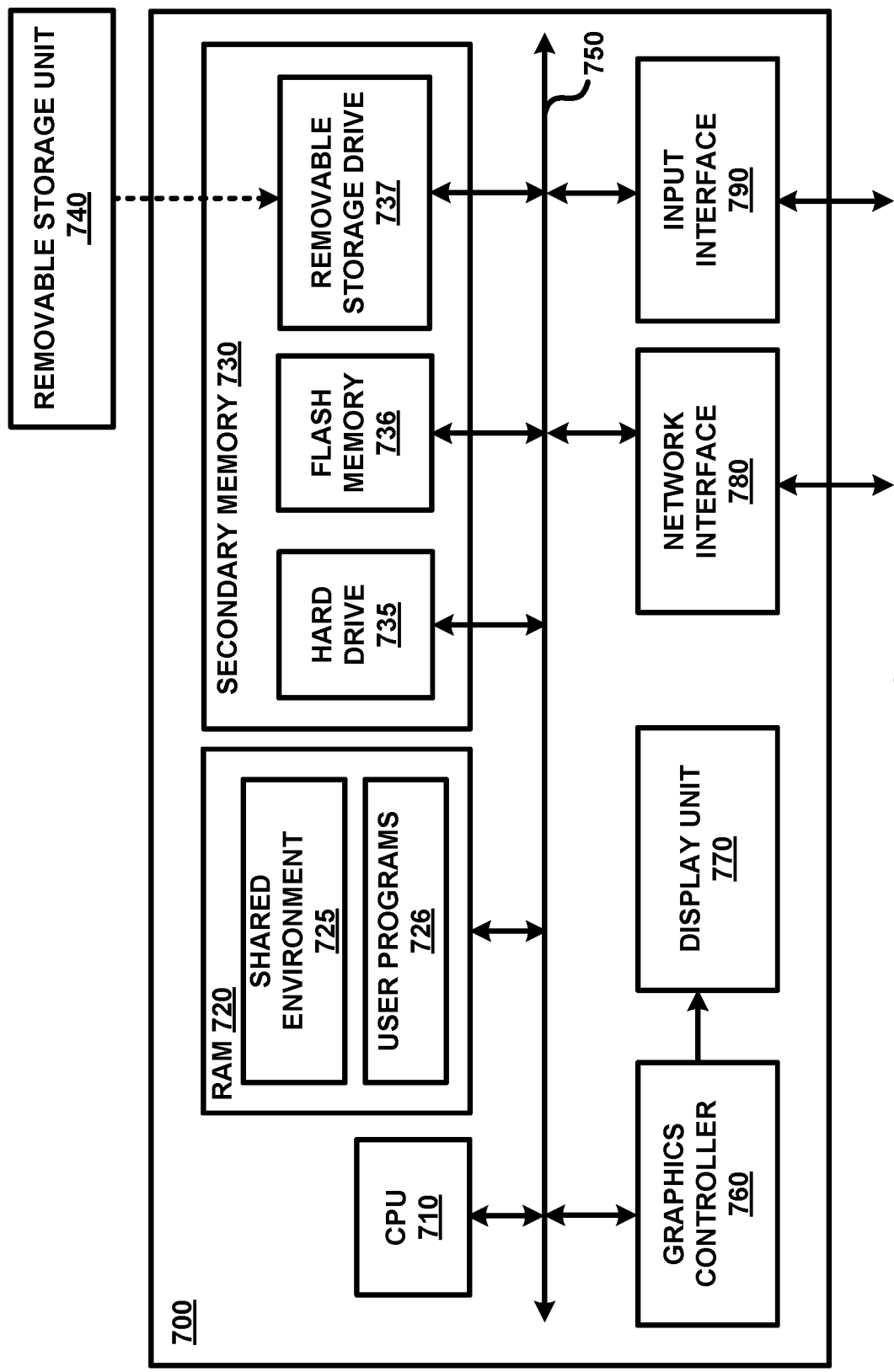
FIG. 7 is a block diagram illustrating the details of a digital processing system in which various aspects of the present disclosure are operative by execution of appropriate executable modules.

FIG. 7 is a block diagram illustrating the details of digital processing system 700 in which various aspects of the present disclosure are operative by execution of appropriate executable modules. Digital processing system 700 may correspond to proactive resolution tool 150 (or any system implementing proactive resolution tool 150).

Digital processing system 700 may contain one or more processors such as a central processing unit (CPU) 710, random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present disclosure. CPU 710 may contain multiple processing units, with each processing unit potentially being designed for a specific task. Alternatively, CPU 710 may contain only a single general-purpose processing unit.

RAM 720 may receive instructions from secondary memory 730 using communication path 750. RAM 720 is shown currently containing software instructions constituting shared environment 725 and/or other user programs 726 (such as other applications, DBMS, etc.). In addition to shared environment 725, RAM 720 may contain other software programs such as device drivers, virtual machines, etc., which provide a (common) run time environment for execution of other/user programs.

Graphics controller 760 generates display signals (e.g., in RGB format) to display unit 770 based on data/instructions received from CPU 710. Display unit 770 contains a display screen to display the images defined by the display signals. Input interface 790 may correspond to a keyboard and a pointing device (e.g., touch-pad, mouse) and may be used to provide inputs. Network interface 780 provides connectivity to a network (e.g., using Internet Protocol), and may be used to communicate with other systems connected to the networks.

Secondary memory 730 may contain hard drive 735, flash memory 736, and removable storage drive 737. Secondary memory 730 may store the data (e.g., corresponding to graph shown in FIGS. 3B and 5, data portions shown in FIGS. 7A-6G, etc.) and software instructions (e.g., for implementing the steps of FIGS. 2A and 2B, for implementing the blocks of FIG. 4, etc.), which enable digital processing system 700 to provide several features in accordance with the present disclosure. The code/instructions stored in secondary memory 730 may either be copied to RAM 720 prior to execution by CPU 710 for higher execution speeds, or may be directly executed by CPU 710.

Some or all of the data and instructions may be provided on removable storage unit 740, and the data and instructions may be read and provided by removable storage drive 737 to CPU 710. Removable storage unit 740 may be implemented using medium and storage format compatible with removable storage drive 737 such that removable storage drive 737 can read the data and instructions. Thus, removable storage unit 740 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 740 or hard disk installed in hard drive 735. These computer program products are means for providing software to digital processing system 700. CPU 710 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 730. Volatile media includes dynamic memory, such as RAM 720. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 750. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

11. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A non-transitory machine-readable medium storing one or more sequences of instructions for proactively avoiding performance issues in computing environments, wherein execution of said one or more instructions by one or more processors contained in a digital processing system cause said digital processing system to perform the actions of:

forming in a memory of said digital processing system, a causal dependency graph representing the usage dependencies among a plurality of components deployed on a plurality of nodes in a computing environment during processing of prior user requests received on a network, wherein a first component has a usage dependency on a second component and is represented connected by an edge of said causal dependency graph if said first component is designed to invoke said second component during processing of said prior requests, wherein said first component and said second component are contained in said plurality of components, wherein each component of said plurality of components is associated with a corresponding set of key performance indicators (KPIs), wherein each KPI measures usage of a corresponding resource in the component during processing of prior user requests;

training a probabilistic model with prior incidents that have occurred in said plurality of components, wherein said probabilistic model correlates outliers of one or more KPIs in associated components of said plurality of components to prior incidents, wherein an outlier for a KPI represents a value outside of an acceptable range of values for the KPI, wherein a prior incident represents a failure or defect of a component of said plurality of components, which required a corresponding corrective action to be performed, wherein said training comprises determining said correlation based on said causal dependency graph;

detecting, by an outlier detector module, the occurrence of a set of outliers for a first set of KPIs during the processing of user requests, said first set of KPIs being contained in said plurality of KPIs;

identifying by a predictor module, an imminent performance issue likely to occur in a first component of said plurality of components based on said probabilistic model and said set of outliers, said first component being deployed in a first node of said plurality of nodes; and sending to said first node, by a preventive action generator module, a command, which upon performance on said first node causes change in allocation of one or more resources in said first node to avoid the occurrence of said imminent performance issue in said first component deployed on said first node.

2. The non-transitory machine-readable medium of claim 1, wherein said probabilistic model is a Markov network, wherein said identifying uses a fuzzy matching algorithm to identify said imminent performance issue.

3. The non-transitory machine-readable medium of claim 1, wherein said detecting comprises one or more instructions for receiving from an AIOps (AI for IT operations) system deployed in said computing environment, a plurality of events indicating said set of outliers.

4. The non-transitory machine-readable medium of claim 1, wherein said identifying also identifies a likelihood of occurrence of said imminent performance issue, an ETA (estimated time of arrival) of occurrence of said imminent performance issue, and a severity score associated with said imminent performance issue.

5. The non-transitory machine-readable medium of claim 1, further comprising one or more instructions for:

determining a root cause for said imminent performance issue; and generating a set of preventive actions based on said root cause, said set of preventive actions including sending of said command.

6. The non-transitory machine-readable medium of claim 5, wherein said first set of KPIs are associated with a first set of components contained in said plurality of components, further comprising one or more instructions for finding a central component of said first set of components in said causal dependency graph, wherein said determining determines said central component as said root cause.

7. The non-transitory machine-readable medium of claim 5, further comprising one or more instructions for:

producing a ranked list of probable root causes for said imminent performance issue, wherein the ranking of the probable root causes is based on corresponding confidence scores; and selecting said root cause from said ranked list of probable root causes based on the ranking.

8. The non-transitory machine-readable medium of claim 5, further comprising one or more instructions for providing to an administrator of said computing environment, the details of said imminent performance issue and said set of preventive actions.

9. The non-transitory machine-readable medium of claim 1, further comprising one or more instructions for:

constructing for each node in said causal dependency graph, a corresponding probabilistic distribution function for computing a target KPI, wherein said probabilistic distribution function is defined as a function of a set of KPIs of the node and KPIs associated with dependent nodes in said causal dependency graph;

computing, for each node in said causal dependency graph, using the corresponding probabilistic distribution function constructed for the node, a probability of said target KPI being outside of an acceptable range, wherein said identifying identifies said imminent performance issue upon determining that said probability is high for at least one node in said causal dependency graph.

10. The non-transitory machine-readable medium of claim 9, wherein said causal dependency graph contains a set of end nodes having no further dependencies, wherein the corresponding probabilistic distribution function for each node is constructed by recursively applying the probabilistic distribution function in a bottom-up manner in said causal dependency graph starting from one or more end nodes and moving towards the node in said causal dependency graph.

11. A computer implemented method for proactively avoiding performance issues in computing environments, said method comprising:

forming in a memory of a digital processing system, a causal dependency graph representing the usage dependencies among a plurality of components deployed on a plurality of nodes in a computing environment during processing of prior user requests received on a network, wherein a first component has a usage dependency on a second component and is represented connected by an edge of said causal dependency graph if said first component is designed to invoke said second component during processing of said prior requests, wherein said first component and said second component are contained in said plurality of components;

wherein each component of said plurality of components is associated with a corresponding set of key performance indicators (KPIs), wherein each KPI measures usage of a corresponding resource in the component during processing of prior user requests;

training a probabilistic model with prior incidents that have occurred in said plurality of components, wherein said probabilistic model correlates outliers of one or more KPIs in associated components of said plurality of components to prior incidents, wherein an outlier for a KPI represents a value outside of an acceptable range of values for the KPI, wherein a prior incident represents a failure or defect of a component of said plurality of components, which required a corresponding corrective action to be performed, wherein said training comprises determining said correlation based on said causal dependency graph;

detecting, by an outlier detector module, the occurrence of a set of outliers for a first set of KPIs during the processing of user requests, said first set of KPIs being contained in said plurality of KPIs;

identifying by a predictor module, an imminent performance issue likely to occur in a first component of said plurality of components based on said probabilistic model and said set of outliers, said first component being deployed in a first node of said plurality of nodes; and sending to said first node, by a preventive action generator module, a command, which upon performance on said first node causes change in allocation of one or more resources in said first node to avoid the occurrence of said imminent performance issue in said first component deployed on said first node.

12. The method of claim 11, wherein said probabilistic model is a Markov network, wherein said identifying uses a fuzzy matching algorithm to identify said imminent performance issue.

13. The method of claim 11, wherein said detecting comprises receiving from an AIOps (AI for IT operations) system deployed in said computing environment, a plurality of events indicating said set of outliers.

14. The method of claim 11, wherein said identifying also identifies a likelihood of occurrence of said imminent performance issue, an ETA (estimated time of arrival) of occurrence of said imminent performance issue, and a severity score associated with said imminent performance issue.

15. The method of claim 11, further comprising:

determining a root cause for said imminent performance issue; and generating a set of preventive actions based on said root cause, said set of preventive actions including sending of said command.

16. The method of claim 15, wherein said first set of KPIs are associated with a first set of components contained in said plurality of components, said method further comprising finding a central component of said first set of components in said causal dependency graph, wherein said determining determines said central component as said root cause.

17. The method of claim 15, further comprising providing to an administrator of said computing environment, the details of said imminent performance issue and said set of preventive actions.

18. A digital processing system comprising:

a random access memory (RAM) to store instructions for proactively avoiding performance issues in computing environments; and one or more processors to retrieve and execute the instructions, wherein execution of the instructions causes the digital processing system to perform the actions of:

forming a causal dependency graph representing the usage dependencies among a plurality of components deployed in a computing environment during processing of prior user requests, wherein a first component has a usage dependency on a second component and is represented connected by an edge of said causal dependency graph if said first component is designed to invoke said second component during processing of said prior requests, wherein said first component and said second component are contained in said plurality of components, wherein each component of said plurality of components is associated with a corresponding set of key performance indicators (KPIs);

training a probabilistic model with prior incidents that have occurred in said plurality of components, wherein said probabilistic model correlates outliers of one or more KPIs in associated components of said plurality of components to prior incidents, wherein an outlier for a KPI represents a value outside of an acceptable range of values for the KPI, wherein a prior incident represents a failure or defect of a component of said plurality of components, which required a corresponding corrective action to be performed, wherein said training comprises determining said correlation based on said causal dependency graph;

detecting, by an outlier detector module, the occurrence of a set of outliers for a first set of KPIs during the processing of user requests, said first set of KPIs being contained in said plurality of KPIs;

identifying by a predictor module, an imminent performance issue likely to occur in a first component of said plurality of components based on said probabilistic model and said set of outliers, said first component being deployed in a first node of said plurality of nodes; and sending to said first node, by a preventive action generator module, a command, which upon performance on said first node causes change in allocation of one or more resources in said first node to avoid the occurrence of said imminent performance issue in said first component deployed on said first node.

19. The digital processing system of claim 18, wherein said probabilistic model is a Markov network, wherein for said identifying, said digital processing system uses a fuzzy matching algorithm to identify said imminent performance issue.

20. The digital processing system of claim 18, wherein said detecting comprises receiving from an AIOps (AI for IT operations) system deployed in said computing environment, a plurality of events indicating said set of outliers.

21. The digital processing system of claim 18, wherein said digital processing system also identifies a likelihood of occurrence of said imminent performance issue, an ETA (estimated time of arrival) of occurrence of said imminent performance issue, and a severity score associated with said imminent performance issue.

22. The digital processing system of claim 18, further performing the actions of:

determining a root cause for said imminent performance issue; and generating a set of preventive actions based on said root cause, said set of preventive actions including sending of said command.

23. The digital processing system of claim 22, wherein said first set of KPIs are associated with a first set of components contained in said plurality of components, said digital processing system further performing the actions of finding a central component of said first set of components in said causal dependency graph, wherein said determining determines said central component as said root cause.

24. The digital processing system of claim 22, further performing the actions of providing to an administrator of said computing environment, the details of said imminent performance issue and said set of preventive actions.

* * * * *